April 24, 1951 W. P. MURRELL 2,550,200
AUXILIARY SEAT FOR BICYCLES
Filed Dec. 17, 1946
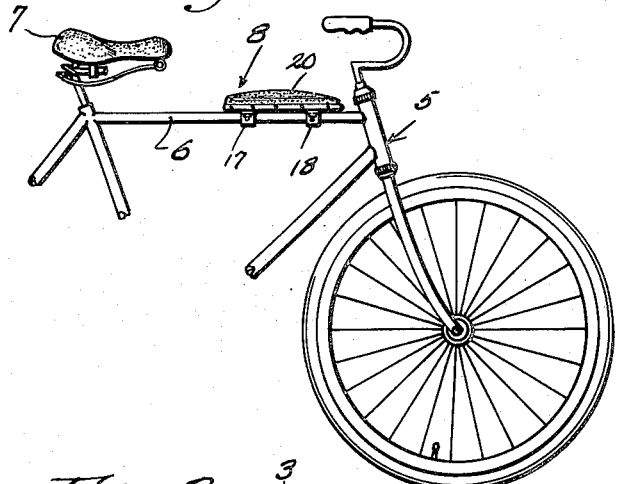
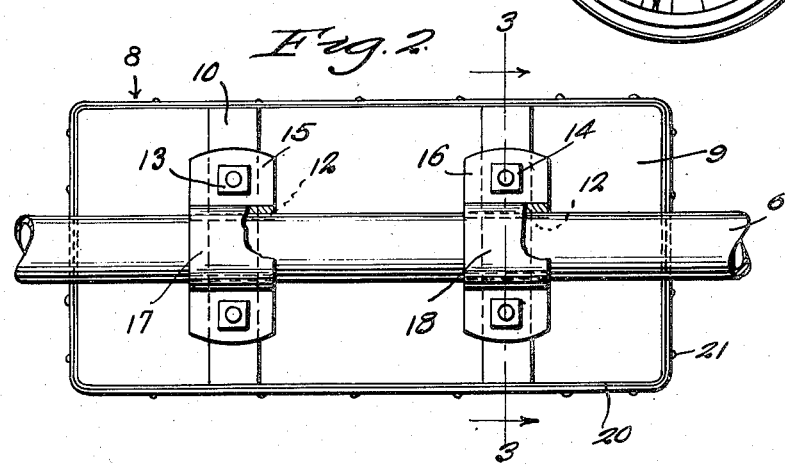
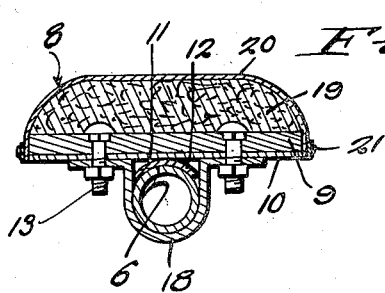
Inventor
WILLIAM P. MURRELL
By *Clarence A. O'Brien
and Harvey B. Jacobson*
Attorneys & nbsp;

UNITED STATES PATENT OFFICE 2,550,200

AUXILIARY SEAT FOR BICYCLES

William P. Murrell, Norman, Okla.

Application December 17, 1946, Serial No. 716,787

2 Claims. (Cl. 155—5.12)

This invention relates to new and useful improvements in auxiliary seats for bicycles.

The primary feature of this invention is to provide a device of the character referred to that is quickly and readily attached to the usual horizontal bar of a bicycle frame for the purpose of comfortably seating a second person.

Another important feature of this invention is to provide an auxiliary seat for bicycles which is adjustably fixed on said horizontal bar of a bicycle so that said auxiliary seat may be pushed toward or away from the handle bars of said bicycle.

A further feature of this invention is to provide an adjustable auxiliary seat for bicycles that is adapted to clamp tightly to the horizontal bar of said bicycle without slipping or turning, whereby said seat will provide a safe, comfortable seat for a second person.

A still further feature of this invention is to provide a device of this character that is strong and durable in construction, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 represents a fragmentary side elevational view of a bicycle equipped with the auxiliary seat;

Figure 2 is an enlarged bottom plan view of the seat shown attached to the horizontal bar of a bicycle frame (shown in part), and Figure 3 is a sectional view taken on the line 3—3 of Figure 2.

Referring now to the drawings in detail, wherein for the purpose of illustration, I have disclosed a preferred embodiment of the invention, the numeral 5 represents a bicycle frame which includes a horizontal top bar 6. Numeral 7 denotes the usual bicycle seat.

The auxiliary seat designated generally at numeral 8 consists substantially of a rectangular-shaped board or base plate 9 having a pair of parallel and transversely disposed metallic strips 10 secured to the underside of said board 9 in any suitable manner.

Welded or otherwise secured at 11 to the center of said strips are a pair of downwardly curved headers 12 that are adapted to conform to the curvature of the upper periphery of said horizontal bar 6.

Pairs of bolts and nuts 13 and 14 extend downwardly from said base 9 and respectively through said metallic strips 10 on opposite sides of said headers 12, said bolts and nuts 13 and 14 are adapted for securing the arms 15 and 16 of a pair of U-shaped clamps 17 and 18 to said strips 10. The clamps are adapted to bear on the underside of said horizontal bar so that the clamps and headers contact substantially the entire periphery of said bar 6 to prevent slipping or turning of the seat on the frame.

For the purpose of making said seat comfortable for an additional passenger, padding 19 is placed on said upper face of base 9 and a covering 20 placed over said padding is secured to the side and end edges of said base by suitable fastening means 21.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

1. In combination with a bicycle frame including a round horizontal bar, a seat having a pair of transversely extending metallic strips secured to the underside thereof, a pair of downwardly curved headers carried by the center of said strips adapted to bear on the upper periphery of said horizontal bar, and a pair of U-shaped clamps carried by the seat directly under said headers, said clamps adjustable upwardly to bear against the lower periphery of said horizontal bar.

2. In combination with a bicycle frame including a round horizontal bar, an auxiliary seat comprising a rectangular board having padding and covering at the upper face thereof, a pair of transversely extending metallic strips secured to the underside of said board, a pair of downwardly curved headers carried by the center of said strips and adapted to bear on the upper periphery of said horizontal bar, and a pair of adjustable U-shaped clamps carried by said board directly under said headers, said clamps adapted to bear upwardly against the lower periphery of said bar.

WILLIAM P. MURRELL.

(References on following page)

REFERENCES CITED

The following references are of record in the file of this patent:

UNITED STATES PATENTS

| Number | Name | Date |
|---|---|---|
| 673,207 | Huber | Apr. 30, 1901 |
| 2,345,970 | Hamel | Apr. 4, 1944 |

FOREIGN PATENTS

| Number | Country | Date |
|---|---|---|
| 21,061 | Great Britain | of 1910 |
| 28,592 | Great Britain | of 1913 |
| 135,363 | Great Britain | Nov. 27, 1919 |
| 554,892 | France | Mar. 11, 1923 |
| 584,419 | Germany | Sept. 20, 1933 |